(12) United States Patent
Riou

(10) Patent No.: US 10,547,461 B2
(45) Date of Patent: Jan. 28, 2020

(54) METHOD AND APPARATUS FOR BINDING STACKED DIE USING A PHYSICALLY UNCLONABLE FUNCTION

(71) Applicant: NXP B.V., Eindhoven (NL)

(72) Inventor: Sebastien Riou, Hamburg (DE)

(73) Assignee: NXP B.V., Eindhoven (NL)

( * ) Notice: Subject to any disclaimer, the term of this patent is extended or adjusted under 35 U.S.C. 154(b) by 142 days.

(21) Appl. No.: 15/451,589

(22) Filed: Mar. 7, 2017

(65) Prior Publication Data
US 2018/0262353 A1 Sep. 13, 2018

(51) Int. Cl.
*H04L 9/32* (2006.01)
*H01L 25/065* (2006.01)
*H01L 23/00* (2006.01)
*H01L 25/00* (2006.01)
*G06F 21/72* (2013.01)
*G09C 1/00* (2006.01)

(52) U.S. Cl.
CPC ............ *H04L 9/3278* (2013.01); *G06F 21/72* (2013.01); *G09C 1/00* (2013.01); *H01L 23/57* (2013.01); *H01L 23/576* (2013.01); *H01L 25/0657* (2013.01); *H01L 25/50* (2013.01); *H01L 2225/06506* (2013.01); *H01L 2225/06513* (2013.01); *H01L 2225/06541* (2013.01); *H01L 2225/06555* (2013.01); *H01L 2225/06593* (2013.01); *H04L 2209/12* (2013.01)

(58) Field of Classification Search
CPC .......... G06F 21/72; G06F 21/10; G06F 21/64; H04L 63/145; H04L 9/3278
See application file for complete search history.

(56) References Cited

U.S. PATENT DOCUMENTS

| | | | |
|---|---|---|---|
| 6,962,294 B2 | 11/2005 | Beit-Grogger et al. | |
| 7,555,787 B2 | 6/2009 | Clercq | |
| 8,074,082 B2 * | 12/2011 | Ozguz | G06F 21/87 713/194 |
| 8,143,705 B2 | 3/2012 | Van et al. | |
| 8,198,641 B2 | 6/2012 | Zachariasse | |
| 8,657,191 B2 | 2/2014 | Zieren et al. | |
| 8,694,856 B2 | 4/2014 | Tuyls et al. | |
| 2002/0051401 A1 * | 5/2002 | Lee | G11C 5/025 365/230.03 |
| 2003/0218475 A1 | 11/2003 | Gammel | |

(Continued)

FOREIGN PATENT DOCUMENTS

WO WO-2007/063475 A2 6/2007

*Primary Examiner* — Ali S Abyaneh
(74) *Attorney, Agent, or Firm* — Daniel D. Hill

(57) ABSTRACT

An integrated circuit device includes first and second semiconductor die and a physically unclonable function (PUF). The second semiconductor die is attached, at least partially, to the first semiconductor die using the PUF. The PUF includes a plurality of conductive paths formed between the first semiconductor die and the second semiconductor die. The PUF controller is coupled to the PUF for generating a digital value based on a characteristic of each conductor of the plurality of conductive paths. The digital value logically binds the first semiconductor die to the second semiconductor die. The first semiconductor die may include a nonvolatile memory and the digital value may be an encryption key for encrypting data stored in the nonvolatile memory.

17 Claims, 3 Drawing Sheets

(56) References Cited

U.S. PATENT DOCUMENTS

| | | |
|---|---|---|
| 2007/0121575 A1 | 5/2007 | Savry et al. |
| 2008/0024479 A1 | 1/2008 | Jung et al. |
| 2009/0001821 A1 | 1/2009 | Walker et al. |
| 2010/0314742 A1* | 12/2010 | Kim ................. H01L 21/76898 257/690 |
| 2011/0234241 A1 | 9/2011 | Lewis et al. |
| 2013/0141137 A1* | 6/2013 | Krutzik ................ H03K 19/173 326/8 |
| 2013/0307578 A1 | 11/2013 | Ostertun et al. |
| 2013/0320560 A1 | 12/2013 | Secker et al. |
| 2014/0042627 A1 | 2/2014 | Edelstein et al. |
| 2014/0042628 A1 | 2/2014 | Edelstein et al. |
| 2014/0049359 A1 | 2/2014 | Riou |
| 2014/0077835 A1 | 3/2014 | Amanuma et al. |
| 2014/0157404 A1 | 6/2014 | Chhabra et al. |
| 2014/0245384 A1* | 8/2014 | Shieh ...................... G06F 21/44 726/2 |
| 2016/0092680 A1* | 3/2016 | Hennig ................. G06F 21/552 713/193 |
| 2017/0344760 A1* | 11/2017 | Jennings ............... G06F 21/554 |

\* cited by examiner

METHOD AND APPARATUS FOR BINDING STACKED DIE USING A PHYSICALLY UNCLONABLE FUNCTION

BACKGROUND

Field

This disclosure relates generally to electronic circuits and more specifically to a method and apparatus for binding stacked die using a physically unclonable function (PUF).

Related Art

High performance integrated circuits, such as a system on a chip (SoC), may be implemented in the most advanced fabrication process available. Generally, the most advanced technology provides advantages, such as increased operating speed and lower power consumption. However, nonvolatile memory (NVM) technology may not be as advanced as that used to fabricate an SoC. In some embodiments, it may be possible to include another semiconductor die having the NVM, such as a EEPROM (electrically erasable programmable read only memory) or flash memory in the same package as the SoC. A common solution is to use a "stacked die" arrangement with the two semiconductor die stacked one on top of the other in the same package. However, in a security application, the NVM die may be vulnerable to attack. A motivated attacker may be able to open the package containing the two semiconductor die and replace the NVM die with a field programmable gate array (FPGA) in order to gain protected information or functionality.

Therefore, a need exists for way to provide better security for stacked die.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
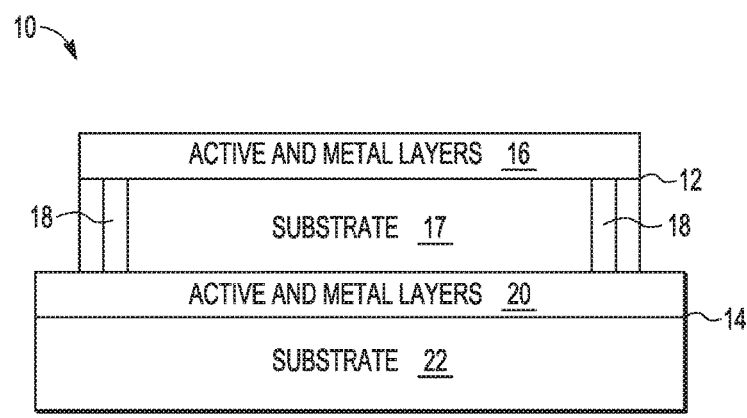
FIG. 1 illustrates a cross-sectional view of a stacked die integrated circuit (IC) device in accordance with an embodiment.

Generally, there is provided, an integrated circuit device having first and second semiconductor die, wherein the second semiconductor is stacked on the first semiconductor die. The second semiconductor die is attached, at least partially, to the first semiconductor die using a physically unclonable function (PUF). The PUF includes a plurality of conductive paths formed between the first semiconductor die and the second semiconductor die. A PUF controller is coupled to the PUF. The PUF controller generates a digital value based on an impedance of each of the plurality of conductive paths. The digital value is for binding the first semiconductor die to the second semiconductor die so that separating the first and second semiconductor die causes encrypted data stored on one of the die to become irretrievable.

In one embodiment, there is provided, an integrated circuit device comprising: a first semiconductor die; a second semiconductor die attached, at least partially, to the first semiconductor die using a physically unclonable function (PUF) comprising a plurality of conductive paths formed between the first semiconductor die and the second semiconductor die; and a PUF controller, coupled to the PUF, for generating a digital value based on a characteristic of each conductor of the plurality of conductive paths, wherein the digital value is for binding the first semiconductor die to the second semiconductor die. The first semiconductor die may comprise a memory, and wherein the digital value may be characterized as being an encryption key for encoding data stored on the memory. The memory may be a nonvolatile memory used to provide a monotonic counter. The plurality of conductive paths may comprise a plurality of metal lines formed on a surface of the second semiconductor die, the plurality of metal lines being laid out to have substantially a same length. The integrated circuit device may further comprise: a plurality of line drivers coupled to a first end of the plurality of conductive paths; a plurality of line receivers coupled to a second end of the plurality of conductors; and a PUF controller coupled to the plurality of line drivers and to the plurality of line receivers, the PUF controller for measuring the characteristic of each of the plurality of conductive paths and calculating the digital value. Each conductor of the plurality of conductive paths may comprise a through silicon via (TSV) formed through the second semiconductor die. The integrated circuit device may further comprise a third semiconductor die. The characteristic may be an impedance of each conductor of the plurality of conductive paths. The plurality of conductive paths may further comprise a plurality of pads formed in a pattern on a surface of the first semiconductor die, and a plurality of pads formed in the pattern on a surface of the second semiconductor die so that the plurality of pads on both first and second semiconductor die align with each other and make electrical contact when the first semiconductor die is attached to the second semiconductor die, and wherein the first and second semiconductor die may be attached in misalignment to prevent electrical contact between at least some of the plurality of pads.

In another embodiment, there is provided, an integrated circuit device comprising: a first semiconductor die comprising a nonvolatile memory; a second semiconductor die attached, at least partially, to the first semiconductor die using a physically unclonable function (PUF) comprising a plurality of conductive paths formed between the first semiconductor die and the second semiconductor die; and a PUF controller, coupled to the PUF, for generating an encryption key based on an impedance of each conductor of the plurality of conductive paths, wherein the encryption key is for encrypting data stored in the nonvolatile memory. The plurality of conductive paths may comprise one or more of a wire bond, through silicon via (TSV), or a solder ball. The first and second semiconductor die may be attached to each other in a stacked die arrangement. The integrated circuit device may further comprise a third semiconductor die. The plurality of conductive paths may further comprise a plurality of pads formed in a pattern on a surface of the first semiconductor die, and a plurality of pads formed in the pattern on a surface of the second semiconductor die so that the plurality of pads on both first and second semiconductor die align with each other and make electrical contact when the first semiconductor die is attached to the second semiconductor die, and wherein the first and second semiconductor die may be attached in misalignment to prevent electrical contact between at least some of the plurality of pads. The plurality of conductive paths may comprise a plurality of metal lines formed on a surface of the second semiconductor die, the plurality of metal lines being laid out to have substantially a same length.

In yet another embodiment, there is provided, a method for logically binding first and second semiconductor die together for use in a security application, the method comprising: providing a plurality of first terminals on a surface of the first semiconductor die and a plurality of second terminals on a surface of the second semiconductor die; providing a plurality of conductors on the surface of the second semiconductor die, each end of the plurality of conductors coupled to a corresponding one of the plurality of second terminals; measuring a characteristic of each conductor of the plurality of conductors; and calculating a digital value based on the measured characteristics. The characteristic may be an impedance of each conductor. The first semiconductor die may comprise a nonvolatile memory and the digital value is an encryption key for encrypting data stored in the nonvolatile memory. All the plurality of conductors may be substantially the same length. Providing a plurality of first terminals may comprise forming the plurality of first terminals so that the plurality of first terminals aligns with the plurality of second terminals when the first and second semiconductor die are attached to each other. The method may further comprise misaligning the first and second semiconductor die to prevent electrical contact between at least some of the first plurality of terminals to corresponding terminals of the second plurality of terminals.

Figure 5:
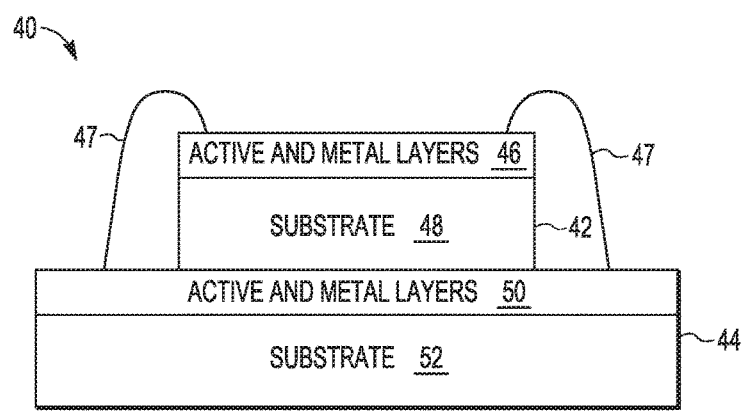
FIG. 5 illustrates a cross-sectional view of a stacked die IC device in accordance with another embodiment.

FIG. 1 illustrates a cross-sectional view of a stacked die integrated circuit (IC) device 10 in accordance with an embodiment. Integrated circuit device 10 includes semiconductor die 12 and semiconductor die 14. Semiconductor die 12 includes a layer 16 comprising active circuitry and interconnects. Layer 16 is formed in and on semiconductor substrate 17. The active layer includes passive and active devices such as transistors, diodes, resistors, capacitors, and the like. The interconnects include alternating layers of patterned metal lines and insulating layers. The patterned metal lines are for conducting signals to components on and off the die. In one embodiment, the semiconductor substrate 17 is formed from silicon and the active circuitry comprises non-volatile memory (NVM) cells formed in an array. In some embodiments, stacked die 12 and 14 may be packaged using an encapsulation material and conventional encapsulation techniques (not shown). Terminals may be provided for making electrical connections between semiconductor die 12 and 14 and other circuitry (not shown). The terminals may include, for example, an array of solder balls formed on pads, or leads from a lead frame. The NVM may include any type of NVM cell, such as for example, flash, EEPROM (electrically erasable programmable read only memory), MRAM (magnetic read only memory), and the like. The NVM may be used to store encrypted data, or may be used to provide a monotonic counter. Other circuitry may be formed in the layer 16 from transistors formed using complementary metal-oxide semiconductor (CMOS) technology. In other embodiments, the technology and transistor types may be different. The interconnects include one or more layers comprising conductors formed from patterned metal such as copper and aluminum. The interconnects are for providing electrical communication of signals and power supply to the active circuitry and to communicate with other devices external to semiconductor die 12. Semiconductor die 14 includes layer 20 comprising active circuitry and interconnects. Layer 20 is formed in and on semiconductor substrate 22. In one embodiment, the semiconductor substrate 17 is formed from silicon and the active circuitry comprises, for example, CMOS transistors for forming, for example, logic gates. In another embodiment, the transistor types may be different. Semiconductor die 12 and 14 are electrically connected using through silicon vias (TSVs) 18. The TSVs may be substituted for with wire bonds or solder balls in other embodiments. An embodiment having wire bonds is illustrated in FIG. 5 and will be discussed later.

Figures 2, 3:
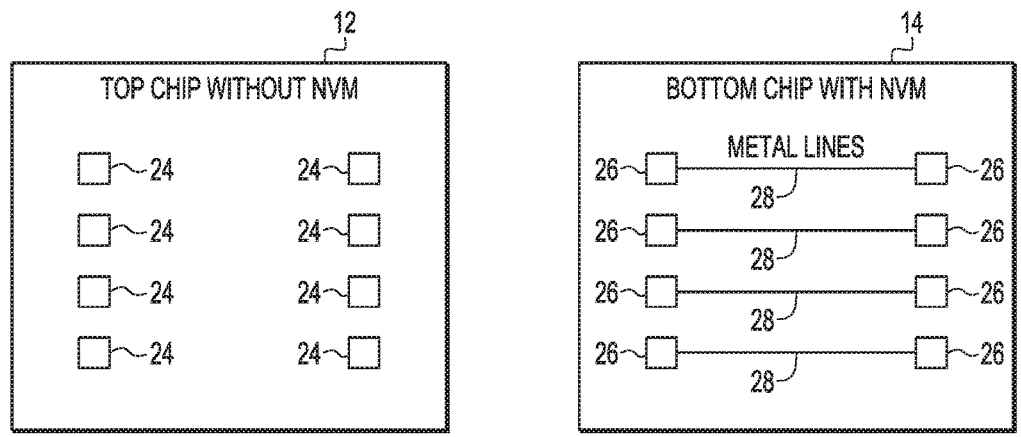
FIG. 2 illustrates a top down view of a surface of the top IC in accordance with an embodiment.
FIG. 3 illustrates a top-down view of a surface of the bottom IC in accordance with an embodiment.

FIG. 2 illustrates a top down view of a surface of first semiconductor die 12 in accordance with an embodiment. A plurality of terminals 24 are provided for electrically connecting the circuitry of active and metal layers 16 to second semiconductor die 14. The plurality of terminals is formed on a surface of substrate 17 on a side opposite active and metal layers 16. The plurality of terminals 24 is connected to the active and metal layers 16 by TSVs 18, illustrated in FIG. 1, where one TSV 18 corresponds to one terminal 24.

FIG. 3 illustrates a top-down view of a surface of semiconductor die 14 in accordance with an embodiment. A plurality of terminals 26 is formed on a surface of active and metal layers 20. The plurality of terminals 26 are positioned and arranged to correspond with the location and arrangement of plurality of terminals 24 when semiconductor die 12 is stacked on semiconductor die 14. The plurality of terminals 24 are then electrically connected with the plurality of terminals 26. In one embodiment, solder or a conductive adhesive is used to make the electrical connections. A plurality of metal lines 28 are formed between pairs of terminals 26. The plurality of metal lines 28 are laid out to have substantially the same lengths and widths. The plurality of metal lines 28 may be implemented in one of the interconnect layers of active and metal lines 20 in die 14. Four metal lines are illustrated in FIG. 3 for purposes of simplicity and clarity. In one embodiment, the metal lines may be formed to provide an encryption key of 128 bits. Also, in another embodiment, the metal lines may be formed from another conductive material, such as for example, polysilicon.

When pluralities of terminals 24 and 26 are bonded together, a conductive path is formed from active circuitry and metal layers 16 to terminal 24, to one end of a TSV 18, through TSV 18 to a terminal 26 at the other end TSV 18 on semiconductor die 14. Then through a metal line 28 to another terminal 26, and through a TSV 18 to another terminal 24 on semiconductor die 12.

When the first and second semiconductor dies 12 and 14 are joined in a stacked die arrangement, the conductive paths together form a physically unclonable function (PUF). A physically unclonable function (PUF) is a physical system that will produce an unpredictable response when a stimulus is input. A PUF can be used to generate an encryption key because it is very difficult, or nearly impossible, to recreate. There are a number of ways to produce a PUF. One example uses the startup state of a static random access memory (SRAM). In the illustrated embodiment, the PUF includes a plurality of conductive paths having a plurality of parallel conductors. Each of the plurality of conductors has about the same laid out length and width. Even though the metal lines are substantially the same, impedance values for each of the lines will vary because of, for example, manufacturing variations and temperature changes. A characteristic of the plurality of metal lines, such as impedance, provides a digital value that can be used to generate, for example, an encryption key. In one embodiment, a relative impedance of each of the metal lines determines whether a logic one or a logic zero is provided by a metal line of the PUF. If the stacked die are separated, the impedance values of each of the plurality of conductive paths would be difficult to determine and reconstruct because the lines are laid out so that the differences in impedance values is relatively small and because the solder bonds in the conductive paths contribute to the difference in impedance. The solder bonds need to be destroyed to separate the dies and thus the contribution of the solder bonds to the total impedance of the conductive paths cannot be measured.

Figure 4:
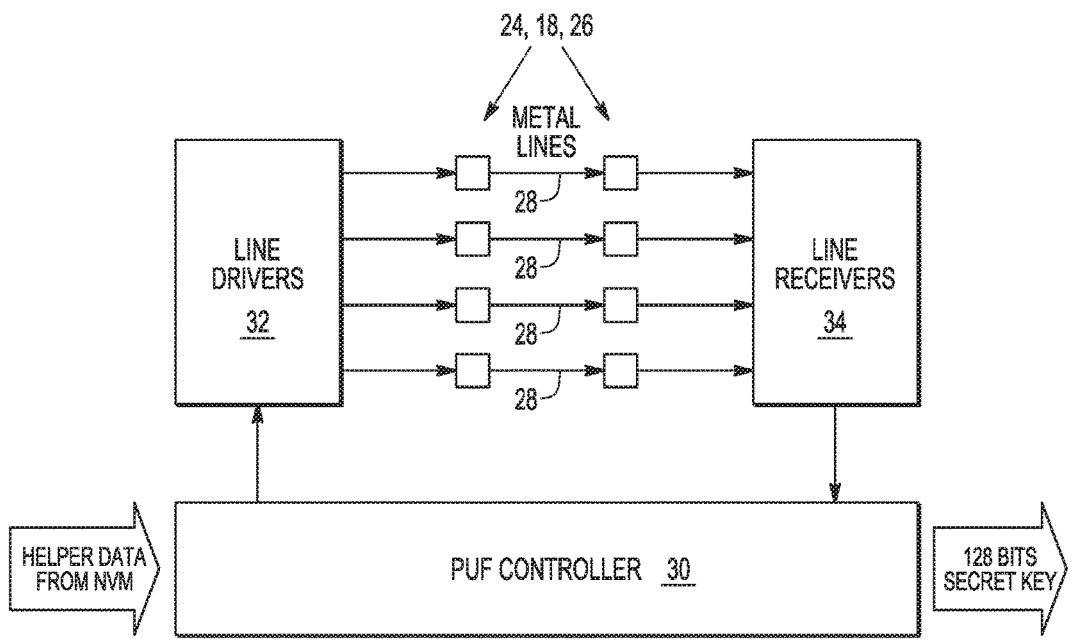
FIG. 4 illustrates, in block diagram form, a system for binding stacked die in accordance with another embodiment.

FIG. 4 illustrates, in block diagram form, a system for binding stacked die in accordance with another embodiment. The system includes line drivers 32 and line receivers 34 connected to PUF controller 30. In the illustrated embodiment, the system is implemented on semiconductor die 12. The conductive paths are illustrated connecting from line drivers 32 to the plurality of terminals 24, TSVs 18 and the plurality of terminals 26, metal lines 28, plurality of terminals 26, and line receivers 34. Only four conductive paths are illustrated for the purposes of simplicity and clarity. In an actual implementation, more conductive paths would be provided to create, for example, a 128-bit encryption key. Because the lines are laid out to be the same length and width, the impedances of the conductive paths between the two die will be relatively close to each other. If the two stacked die are separated, it would be unlikely an attacker could recreate the impedances of each of the metal lines so that the impedances would be the same as before being separated.

In one embodiment, line drivers 32 provide a time varying signal at one end of the metal lines 28, and line receivers 34 comprise a termination circuit. A voltage or current, either measured over time or instantaneous and measured at line receivers 34, may be used to provide an impedance value for each metal line. The impedance would be compared to a reference impedance to determine if the metal line is providing a logic one or a logic zero. Alternately, a comparator or arbitration circuit coupled between two lines may be used to determine the logic states between two conductive paths. Also, the reference impedance may be provided by a selected one of the conductive paths in one embodiment. Alternately, the reference impedance may be provided by an adjacent conductive path, where an impedance of each conductive path is compared to an impedance of the adjacent conductive path. Other techniques for providing the reference may be used in other embodiments. Because the measured impedances may be different each time the device is powered up, helper data may be used to help recreate the cryptographic key from the PUF. The helper data may be stored in the NVM of semiconductor die 14 and is provided to PUF controller 30 to be used to generate the cryptographic key. The reconstructed cryptographic key is used to encrypt and decrypt data stored in the NVM. If the device is separated by an attacker, the helper data will be useless because the digital value from the PUF cannot be recreated. The algorithm used for the encryption can be any encryption algorithm, such as for example, advanced encryption standard (AES) or elliptic curve cryptography (ECC).

FIG. 5 illustrates a cross-sectional view of stacked die IC device 40 in accordance with another embodiment. Stacked die IC device 40 includes semiconductor die 42 and semiconductor die 44. Semiconductor die 42 includes active and metal layers 46 formed at a surface of substrate 48, and semiconductor die 44 includes active and metal layers 50 formed at a surface of substrate 52. The active layers include passive and active devices such as transistors, diodes, resistors, capacitors, and the like. Stacked die IC device 40 is the same as stacked die IC device 10 except that TSVs 18 have been replaced with a plurality of wire bonds 47 in the conductive paths that form the PUF. Preferably the bond wires are substantially the same length when attached to the dies 42 and 44. The use of wire bonds requires that wire bond pads be positioned on semiconductor die 44 so that they are exposed when semiconductor die 42 is attached to semiconductor die 44. Die 42 and 44 may be attached to each other using any suitable adhesive or tape. After the die are attached, the wire bonds are attached to both die. Note that in the embodiment of FIG. 5, the pads on semiconductor die 42 will not align with the pads of semiconductor die 44 as described in the embodiment of FIG. 1.

Figure 6:
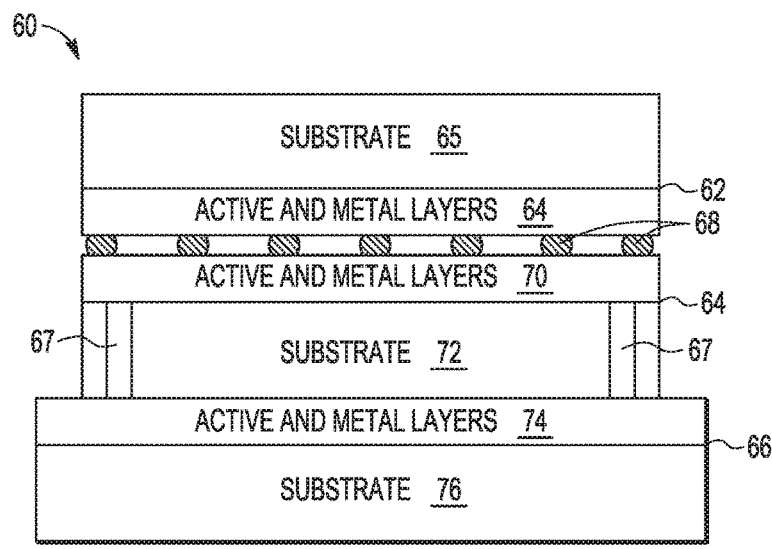
FIG. 6 illustrates a cross-sectional view of a stacked die IC device in accordance with another embodiment.

FIG. 6 illustrates a cross-sectional view of a stacked die IC device 60 in accordance with another embodiment. Stacked die IC device 60 includes three semiconductor die. The three die may be encapsulated in accordance with known encapsulation techniques. As illustrated in FIG. 6, semiconductor die 62 is the top die, semiconductor die 64 is the middle die, and semiconductor die 66 is the bottom die. Semiconductor die 62 includes active and metal layers 64 formed on substrate 65. Semiconductor die 64 includes active and metal layers 70 formed on substrate 72. Semiconductor die 66 includes active and metal layers 74 formed on substrate 76. A plurality of solder balls 68 is used to electrically attach pads on the active surface of die 62 to pads on the active surface of die 64. A plurality of TSVs 67 is used to route signals between the active surface of die 64 to the bottom surface of die 64. The plurality of TSVs 67 may be used to electrically connect the active surface of die 64 to the active surface of die 66. Die 66 may include an NVM. In one embodiment, a PUF is formed having a plurality of conductive paths from active surface 70 through TSVs 67 to active layer 74 of die 66, where a plurality of metal lines is formed as shown in FIG. 3, and the conductive path continues back through TSVs 67 to active surface 70 of die 64. Line drivers, line receivers, and a PUF controller, as illustrated in FIG. 4, may be implemented on active surface 70 of die 64. In another embodiment, the conductive paths for the PUF may extend through all three die.

Figure 7:
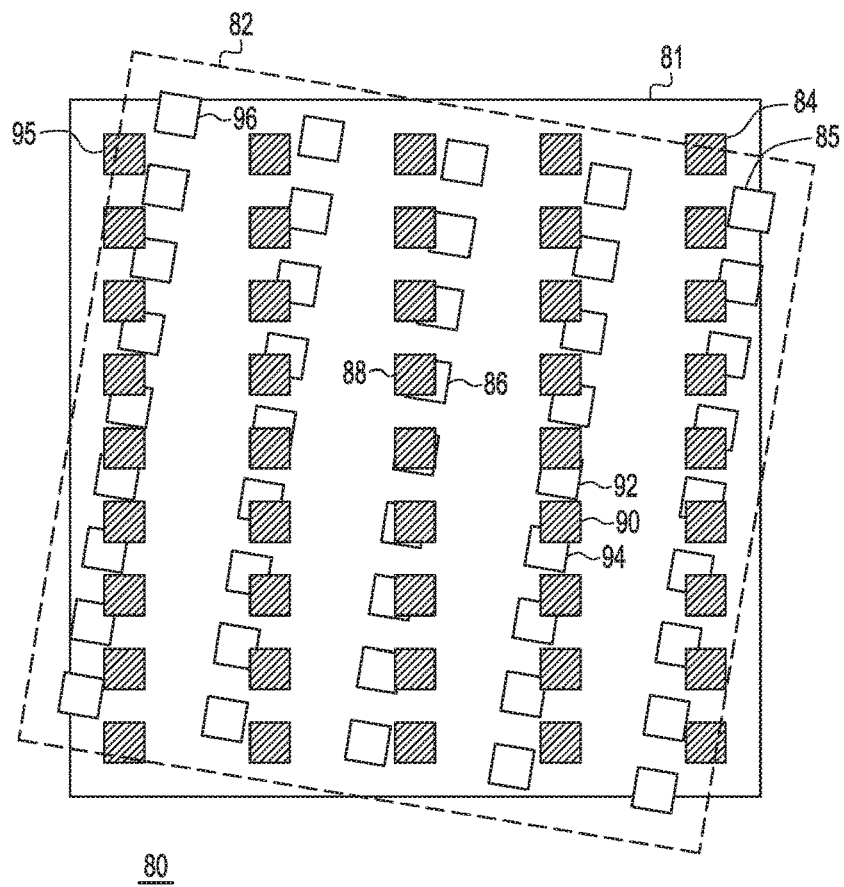
FIG. 7 illustrates a top-down view of a stacked die IC device in accordance with another embodiment.

FIG. 7 illustrates a top-down view of a stacked die IC 80 device in accordance with another embodiment. Stacked die IC 80 includes semiconductor die 81 attached to semiconductor die 82. Each die includes an array of pads or terminals on one surface that are at first positioned and sized to align with each other if the two die were to be stacked in alignment. In one embodiment, the pad arrangement may be in accordance with a Vernier scale. Generally, the conductive paths for forming the PUF are formed between die 80 and 81 as described above. In the embodiment illustrated in FIG. 7, die 80 and 81 may be intentionally misaligned with each other to the extent that discontinuities are created between at least some of the pads in the PUF. Alternately, tiny misalignments due to the production process may be enough misalignment to create a wide variety of contact patterns over the array of pads. The pads can be very small and placed on the die with precision, limited only by the available lithographic patterning technology. It may be possible to detect very small misalignments in die placement. The misalignment is another physical characteristic which is difficult to recreate after the die are separated. However, the intentional misaligned for purposes of creating the PUF should not affect the connections between the die used for signaling and power distribution (not shown). This may be accomplished by making the PUF pads much smaller than the pads intended for signaling and power, so that a relatively small amount of misalignment of the die has the desired effect on the PUF without affecting functionality. The misalignment may include a rotational misalignment as illustrated in FIG. 7, and a misalignment is the X and Y axis. The misalignment may prevent some of the pads on one die from contacting their counterpart pads on the other die. Also, the misalignment might reduce the area of the pads that contact with each other, thus introducing another variable for the resistance calculation in the corresponding conductive path. In addition, one pad on one die may touch two pads on the other die. Such effects may be accentuated with pad sizes and spacing that slightly violates the design rules for the given production process. As examples of the above cases, pads 84 and 85 and pads 95 and 96 illustrate an open circuit between corresponding pads. Pads 86 and 88 are corresponding pads that have reduced contact area. Pads 90, 92, and 94 illustrate an example of three pads shorted together. As discussed above, helper data may be used when recreating the digital value to account for variations caused by process, temperature, and noise.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit device comprising:
a first semiconductor die;
a second semiconductor die attached, at least partially, to the first semiconductor die using a physically unclonable function (PUF) comprising a plurality of conductive paths formed between the first semiconductor die and the second semiconductor die, the plurality of conductive paths comprising a plurality of pads formed in a pattern on a surface of the first semiconductor die and a plurality of pads formed on a surface of the second semiconductor die and having the same pattern as the plurality of pads on the first semiconductor die; and
a PUF controller, coupled to the PUF, generating a digital value based on a characteristic of each conductor of the plurality of conductive paths, wherein the digital value is binding the first semiconductor die to the second semiconductor die, wherein the first and second semiconductor die are intentionally misaligned and attached, wherein the plurality of pads of the first semiconductor die are misaligned with the plurality of pads of the second semiconductor die preventing electrical contact between at least some of the pluralities of pads.

2. The integrated circuit device of claim 1, wherein the first semiconductor die comprises a memory, and wherein the digital value is characterized as being an encryption key for encoding data stored on the memory.

3. The integrated circuit device of claim 2, wherein the memory is a nonvolatile memory used to provide a monotonic counter.

4. The integrated circuit device of claim 1, wherein the plurality of conductive paths comprises a plurality of metal lines formed on a surface of the second semiconductor die, the plurality of metal lines being laid out to have substantially a same length.

5. The integrated circuit device of claim 1 further comprising:
a plurality of line drivers coupled to a first end of the plurality of conductive paths;
a plurality of line receivers coupled to a second end of the plurality of conductors; and
a PUF controller coupled to the plurality of line drivers and to the plurality of line receivers, the PUF controller for measuring the characteristic of each of the plurality of conductive paths and calculating the digital value.

6. The integrated circuit device of claim 5, wherein each conductor of the plurality of conductive paths comprises a through silicon via (TSV) formed through the second semiconductor die.

7. The integrated circuit device of claim 1, further comprising a third semiconductor die.

8. The integrated circuit device of claim 1, wherein the characteristic is an impedance of each conductor of the plurality of conductive paths.

9. An integrated circuit device comprising:
a first semiconductor die comprising a nonvolatile memory;
a second semiconductor die attached, at least partially, to the first semiconductor die using a physically unclonable function (PUF) comprising a plurality of conductive paths formed between the first semiconductor die and the second semiconductor die, the plurality of conductive paths comprising a plurality of pads formed in a pattern on a surface of the first semiconductor die and a plurality of pads formed on a surface of the second semiconductor die and having the same pattern as the plurality of pads on the first semiconductor die; and a PUF controller, coupled to the PUF, generating an encryption key based on an impedance of each conductor of the plurality of conductive paths, wherein the encryption key is encrypting data stored in the nonvolatile memory, wherein the first and second semiconductor die are attached intentionally misaligned so that electrical contact between at least some pads of the pluralities of pads of the first and second semiconductor die is prevented.

10. The integrated circuit device of claim 9, wherein the plurality of conductive paths comprising one or more of a wire bond, through silicon via (TSV), or a solder ball.

11. The integrated circuit device of claim 9, wherein the first and second semiconductor die are attached to each other in a stacked die arrangement.

12. The integrated circuit device of claim 11, further comprising a third semiconductor die.

13. The integrated circuit device of claim 9, wherein the plurality of conductive paths comprises a plurality of metal lines formed on a surface of the second semiconductor die, the plurality of metal lines being laid out to have substantially a same length.

14. A method for logically binding first and second semiconductor die together for use in a security application, the method comprising:

providing a plurality of first terminals on a surface of the first semiconductor die and a plurality of second terminals on a surface of the second semiconductor die, wherein the plurality of first terminals are arranged in a pattern;

providing a plurality of conductors on the surface of the second semiconductor die, each one of the plurality of conductors coupled to a corresponding one of the plurality of second terminals, wherein the plurality of second terminals are arranged in the same pattern as the plurality of first terminals;

intentionally misaligning and attaching the first semiconductor die to the second semiconductor die, wherein a plurality of conductive paths is formed between the plurality of first terminals and the plurality of second terminals, and wherein electrical contact between at least some of the pluralities of terminals is prevented;

measuring a characteristic of each of the plurality of conductive paths;

calculating a digital value based on the measured characteristics; and generating a cryptographic key using the digital value.

15. The method of claim 14, wherein the characteristic is an impedance of each conductor.

16. The method of claim 14, wherein the first semiconductor die comprises a nonvolatile memory and the digital value is an encryption key for encrypting data stored in the nonvolatile memory.

17. The method of claim 14, wherein all the plurality of conductors is substantially the same length.

* * * * *